United States Patent [19]

Bhat et al.

[11] Patent Number: 5,246,471
[45] Date of Patent: Sep. 21, 1993

[54] METHOD AND APPARATUS FOR GAS LIQUID CONTACT

[75] Inventors: Ananda P. Bhat, North Canton; Dennis W. Johnson, Barberton; Robert B. Myers, Copley, all of Ohio

[73] Assignee: The Babcock & Wilcox Company, New Orleans, La.

[21] Appl. No.: 983,109

[22] Filed: Nov. 30, 1992

Related U.S. Application Data

[63] Continuation-in-part of Ser. No. 832,557, Feb. 7, 1992, abandoned.

[51] Int. Cl.⁵ ............................................. B01F 3/04
[52] U.S. Cl. ........................................ 55/223; 55/255; 55/344; 95/36; 261/113; 423/243.09
[58] Field of Search .................... 261/113, 114.1; 423/243.09; 55/73, 223, 255, 344

[56] References Cited

U.S. PATENT DOCUMENTS

| | | | |
|---|---|---|---|
| 2,779,577 | 1/1957 | Olney et al. | 261/113 |
| 2,973,189 | 2/1961 | Chu | 261/114.1 |
| 4,263,021 | 4/1981 | Downs et al. | 261/113 |
| 4,267,156 | 5/1981 | Dauerman et al. | 423/243.09 |
| 4,273,618 | 6/1981 | Strang, Sr. | 261/114.1 |
| 4,315,872 | 2/1982 | Senjo et al. | 261/113 |
| 4,442,083 | 4/1984 | Canales et al. | 423/243.09 |
| 4,515,754 | 5/1985 | Stehning | 423/243.09 |
| 4,689,648 | 8/1987 | Biolchini et al. | 423/243.09 |
| 4,759,884 | 7/1988 | Michimae et al. | 261/113 |
| 4,820,456 | 4/1989 | Kiselev | 261/113 |
| 4,834,959 | 5/1989 | Kent et al. | 423/243.09 |
| 4,869,851 | 9/1989 | Parker et al. | 261/114 1 |
| 4,876,076 | 10/1989 | Colloy | 423/243.09 |
| 5,084,255 | 1/1992 | College et al. | 423/243.09 |

FOREIGN PATENT DOCUMENTS 1296455 11/1972 United Kingdom ............... 261/113

OTHER PUBLICATIONS

The American Heritage Dictionary, Apr. 1982, p. 214.
The Condensed Chemical Dictionary, Apr. 1981, pp. 179, 180.

Primary Examiner—Tim Miles
Attorney, Agent, or Firm—Robert J. Edwards; Michael L. Hoelter

[57] ABSTRACT

A gas-liquid contact system for absorption of gaseous contaminants in an absorptive liquid where contact is attained by a controlled flow relationship between the gas and the liquid forming a fluidized liquid mass for intimate contact between the two.

15 Claims, 3 Drawing Sheets

METHOD AND APPARATUS FOR GAS LIQUID CONTACT

This is a continuation-in-part of application Ser. No. 07/832,557 filed Feb. 7, 1992 now abandoned.

FIELD OF THE INVENTION

This invention pertains to a means for improving the gas-liquid contact within a spray tower and more particularly to means for increasing the removal efficiencies of sulfur oxides and other pollutants or contaminants contained in flue gas.

BACKGROUND OF THE INVENTION

It is well known to use scrubbers or other wet chemical absorption processes to strip the hot flue gases of their contaminants, such as sulfur oxide and the like. Such chemical absorption systems are typically calcium, magnesium or sodium based processes. Generally, in accordance with such processes, the hot gas is washed in an up flow gas-liquid contact device with an aqueous alkaline solution or slurry. This permits the removal of the desired contaminants in a controlled manner and to a controlled degree (efficiencies of upwards of 90% or more are possible).

One typical example of such scrubbers is disclosed in U.S. Pat. No. 4,263,021. While this patent may be considered a standard in the industry, improvements to this technology comprise the subject matter of this invention. Other examples of related technology are cited in this patent, namely: U.S. Pat. No. 3,489,506 to Galstaun et al., U.S. Pat. 3,615,199 to Terrana, and U.S. Pat. No. 3,834,129 to Darlinger et al.

This typical scrubber is currently referred to as a tray or spray/tray scrubber because some means of distributing the gas and liquid within the tower, such as a tray or the like, is incorporated. This tray evens the flow of the flue gas within the tower for more uniform distribution therethrough and also acts as a mass transfer device.

It is an object of this invention to advance existing wet flue gas desulfurization technology by improving spray tower gas distribution. Another object of this invention is to increase both reagent utilization and the rate of mass transfer of sulfur oxides and/or other contaminants from the gas phase to the liquid phase with or without the use of additives. Still another object of this invention is to enhance the uniform mixing of the gas and the liquid by improving gas flow profiles at the face of downstream liquid entrainment devices. Yet another object of this invention is to improve absorption by varying flow velocity, liquid flux rates, pH, suspended solids in the chemically reactive liquid slurry, and the open area of the trays. These and other objects of this invention will become obvious upon further investigation.

SUMMARY OF THE INVENTION

In the present invention, a gas is passed upwardly through a tower in counter-current contact with liquid which is introduced near the top and discharged from the bottom of the tower. Intermediate the height of the tower is positioned at least on horizontally disposed perforated plate upon which the liquid is sprayed. This plate is provided with a plurality of partitions that are arranged to compartmentalize the plate into a plurality of individual open topped compartments. The plate is perforated with a first region having a first open area value and with a second region having a second open area value, these first and second open area values not being equal. The desire being to vary the open area across the cross section of the tower such that the total open area of the plate will be between about 5% and 60% of the total area of the plate.

With proper coordination of liquid and gas flow rates in addition to plate perforation arrangement and spacing dimensions, the gas and liquid will form gasified liquid masses in the compartments leading to stabilized liquid holdup that encourages both intimate contact and sufficient contact time for adequate chemical interchange between the media for absorption purposes. The correlation between flows and dimensions depends on numerous factors, such as the chemical interaction desired, the nature of both the liquid and the gas, as well as the quantities of materials involved.

Additionally, using chemical buffering agents under the proper conditions further encourages or promotes absorption of $SO_2$ from the flue gas in such a gas-liquid contact system. Furthermore, the concentration of the buffering agent is reduced or lowered as compared to systems which do not incorporate gas-liquid contact devices.

DETAILED DESCRIPTION OF THE DRAWINGS

Figure 1:
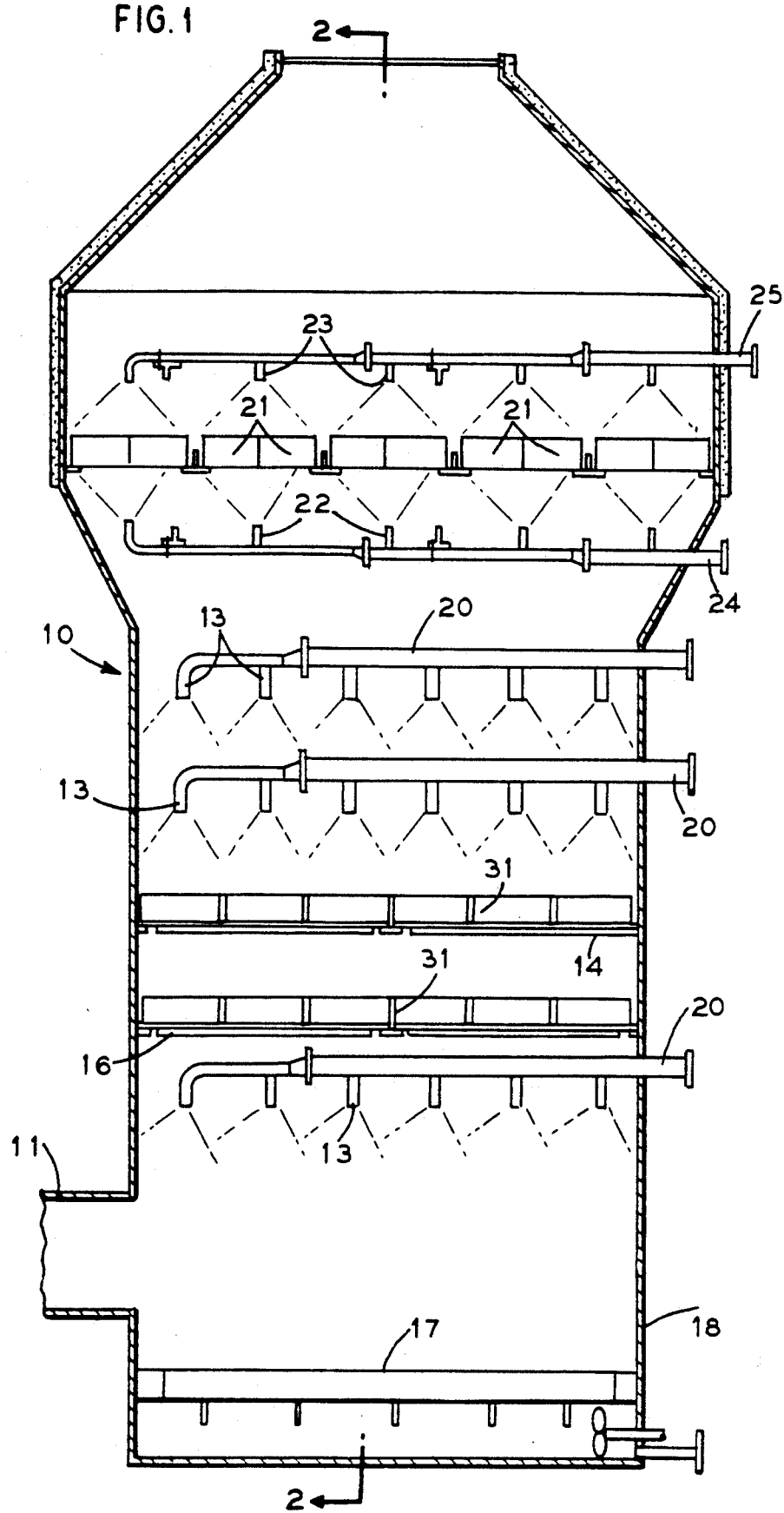
FIG. 1 is a side elevation, in section, of an absorption tower.
Figure 2:
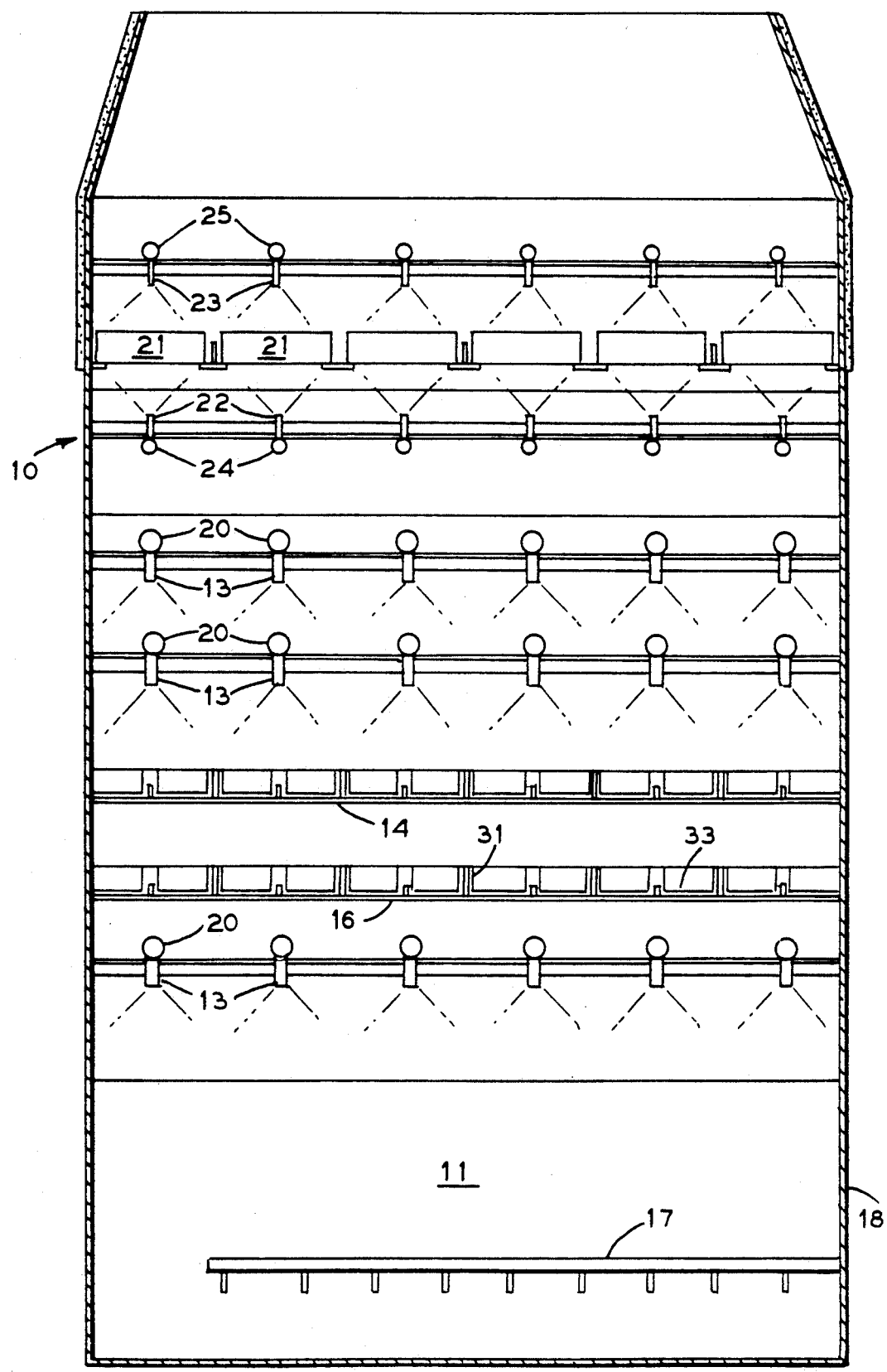
FIG. 2 is an elevation, in section, taken along lines 2—2 of FIG. 1.

This invention pertains to improvements made with respect to technology previously patented by U.S. Pat. No. 4,263,021. Because this invention builds upon such technology, the following description will apply to the modified version of the specification and drawings of this earlier patent.

In the illustrated embodiment of the invention, gases from an external source enter the lower portion of a contact tower 10 (which may be circular, square, rectangular, or any other shape) through inlet duct 11. These gases pass upwardly through tower 10 before being discharged through outlet formed in the top of tower 10. In passing through tower 10, the gases are in counter-current contact with a liquid which is introduced by downwardly direction spray nozzles 13 positioned intermediate the height of the tower and above and/or below the uppermost of a single or a plurality of vertically spaced perforated trays or plates 14 and 16. The liquid slurry gravitates downwardly through the successive perforated plates to discharge through optional sparge header 17 in bottom 18 of tower 10.

Such a gas-liquid contact device is used in contact tower 10 for the purpose of removing sulfur dioxide ($SO_2$) from flue gases formed from the combustion of fossil fuels such as coal, oil and other sulfur containing organic fuels. Intimate gas-liquid contact is necessary to cause high removal of $SO_2$ by absorption into water. However, this reversible reaction:

$$SO_2 + H_2O = HSO_3^- + H^+$$

may be forced to the right by using alkali reagents such as limestone, lime, soda, and the like which further react with the hydrogen ion, $H^+$, to form stable products. It is also known that the use of buffering agents such as dibasic acid (DBA), formic acid, adipic acid and magnesium, ammonium or sodium sulfite can enhance $SO_2$ removal by enhancing $SO_2$ gas/liquid interfacial mass transfer by reducing the pH drop across the gas/liquid interface. It has been found that buffers that work between pH 3.0 and pH 5.5 are most effective. The effectiveness of the buffer is defined by the buffer equilibrium constant (pKa) which is expressed as:

$$pKa = (-\log_{10}[H^+][A^-])/[HA]$$

for buffering compound HA.

While the use of buffering agents is well known and while it is also known that the concentration of the buffer used to make the enhancement is typically 500-5000 ppm, it has not previously been known that with gas-liquid contact device or tray 14, the enhancement is apparent at concentrations much lower than normal and also below 500 ppm. Thus, the amount of buffering agent that must be added to the system to maintain the desired lower concentration value is dependent upon loss mechanisms including (1) chemical degradation such as oxidation; (2) loss with waste liquid or solids; and/or, (3) co-precipitator with the waste solids.

It has been determined by testing that a promoted system which incorporates a tray 14 requires a lower concentration of buffering agent than a system that does not incorporate such a mass transfer device. Alternately, for the same concentration of buffering agent, it has been found that the $SO_2$ removal enhancement is greater with a system that incorporates tray 14 than one that does not have such a gas liquid contact device. This effect is due to the combination of a more effective use of the surface area generated as the gas and liquid pass through both the tray and the froth on the tray as well as operating the tray at the proper pH for the buffering agent to work effectively. In full scale tests using DBA with a limestone reagent, the pH on the tray was measured at 3.7 to 4.3, which averaged about 1.3 pH units less than the pH of the bulk reactant slurry sprayed through nozzles 13. Similar results were obtained in pilot tests at the 4 MWe scale. Therefore, the combined effect of the tray with a buffering agent reduces the required concentration of the buffering agent thereby resulting in a reduced buffering agent feed rate requirement.

For the 4MWe tests, an average of 587 ppm of DBA was used to increase the $SO_2$ removal efficiency from approximately 84.5% (1.86 transfer units*) to approximately 94.5% (2.90 transfer units*) which translates to a 10% or 1.04 transfer unit (NTU) increase. The feed rate of DBA added was 1.8 lb/ton $SO_2$ removed which is substantially lower than prior art which generally ranges from about 8 to 20 lb/ton $SO_2$ removed.

*Note transfer units, NTU, is expressed as:

$$NTU = -\ln(1 - \text{efficiency}/100)$$

In tests where a tray tower was compared to a spray tower without trays under similar conditions, the increase in transfer units for the tray tower was 0.89 NTU vs. 0.49 NTU for the spray tower. Both tests were run at about 500 ppm DBA. Further, at 1500 ppm, the spray tower total removal increase over the result obtained when adding no DBA was 0.96 NTU, however, the improvement while using a tray was 1.25 NTU. In yet another set of tests, the $SO_2$ removal in a tray tower was improved by 1.13 NTU at 600 ppm and by 2.74 NTU at 2000 ppm. Finally, in tests on a commercial unit, $SO_2$ removal was increased by 1.0-1.5 NTU with formic acid at concentrations between 250 and 425 ppm and $SO_2$ removal was increased by 0.3-1.2 NTU with dibasic acid at concentration between 100-500 ppm.

While it is common for trays 14 and 16 to have uniformly spaced and consistently sized openings therein for even gas distribution through tower 10, it has not heretofore been recognized or known that the spacing of these openings can vary or that the size of these openings need not be uniform across the entire tray. This is because of the belief that even gas flow distribution is a requirement for greater gas-liquid contact since absorption is enhanced by the uniform mixing of the gas and the liquid. This is not necessarily the case since it has recently been discovered that by varying the open area of the trays, improvements in gas distribution are possible which result in improved absorption and improved gas flow profiles at the face of downstream liquid entrainment devices (i.e. mist eliminators 21).

To accomplish this variation in trays 14 and 16, the open area of trays 14 and 16 can be increased by increasing the hole size or by putting additional holes or larger holes in a desired area. Alternatively, the open area of trays 14 and 16 can be decreased by using smaller or fewer holes in another specific area of the trays if need be.

In the past, holes sized about 1 ⅜" I.D. were used uniformly across trays 14 and 16. Now, however, hole sizes ranging from about 9/16" I.D. to 2" I.D. or larger (or openings having an area of about 0.25 to 3.14 square inches) are to be incorporated within trays 14 and 16 so as to accomplish greater absorption as described above. Additionally, it has been determined that by using greater sized openings in the trays in scrubbers that operate with gas phase diffusion controlled reactions, absorption of sulfur dioxide ($SO_2$) can occur at about the same efficiency as with 1 ⅜" I.D. holes but at a much reduced (about 10%) pressure drop across the trays. In the past, trays with about 25-50% open area were used, but now, it has become known that trays with an open area as low as 17% can meet process requirements. In fact, depending upon such process requirements, tray open areas may be varied from 5-60%.

Additionally, tests have shown that improved absorption occurs as the tower velocity varies from about 7-8 ft/sec for a fixed geometry tray. This is based on findings that a flow rate of about 7-8 ft/sec results in a minimum of $SO_2$ removal. At flow rates above or below this value, such as 12.5 ft/sec and above for example, $SO_2$ absorption increases dramatically.

With gas and liquid contact occurring uniformly in the zones on and above the perforated plates 14 and 16, the gas ascending through the liquid spray from nozzles 13 will entrain the liquid in small droplet form. Some of the larger droplets may be separated in the tower above manifolds 20 supplying the nozzles, but in any event, all of the gases pass through droplet removal devices 21, such as known nested chevron demisters, to minimize liquid discharge to the atmosphere. Nozzles 22 and 23 supplied by manifolds 24 and 25 wash the inlet and outlet surfaces of demisters 21.

The spray liquid used for absorption may contain reactive solids in suspension to form a slurry. The chemically reactive absorption medium may be a liquid solution, or the chemically reactive absorption medium may be a mixture of solids in suspension and a liquid solution. Ordinarily, the liquid will be water, but other liquids may also be used.

In the past, chemically reactive liquid slurries or liquid solutions contained 5-10% suspended solids. However, it is now learned that trays 14 and 16 can be used in applications with both reactive and nonreactive slurries or liquid solutions with total solids concentrations (i.e. dissolved plus suspended) ranging from near zero to about 40%.

Furthermore, using trays in promoted systems (i.e. systems using buffering agents such as alkali magnesium salts, organic acids, etc.) has resulted in increased $SO_2$ absorption when compared to spray towers with the same base $SO_2$ absorption prior to the use of such promoters, buffering agents and/or additives. This is attributed to increased reaction in the froth layer on the trays due to the buffering capacity of the additives.

While previous references to a liquid flux of approximately 20 GPM/$FT^2$ are known, in the present embodiment, liquid flux rates as low as 5 GPM/$FT^2$ for sodium based systems and greater than 75 GPM/$FT^2$ for limestone systems have been recorded. Additionally, in in situ oxidation limestone wet scrubbing systems, the pH of the liquid on the tray is typically 0.2 to 2.0 pH units less than the pH of the bulk liquid being recirculated inside the scrubber. Such pH depression increases reagent utilization and increases the effect of buffers that work best at the lower pH.

Figure 3:
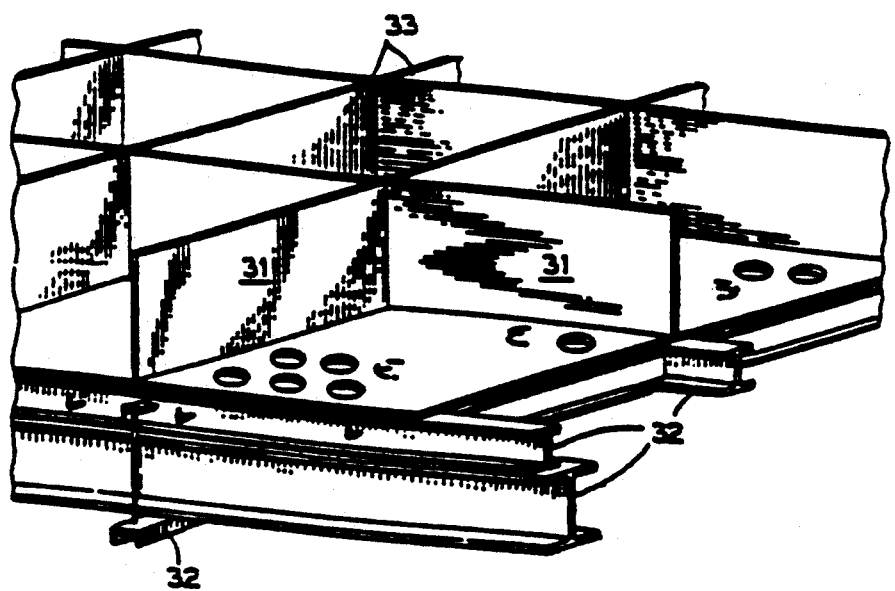
FIG. 3 is a enlarged perspective of a portion of the absorption tower shown in FIGS. 1 and 2.

As shown in the drawings, each of the perforated trays or plates 14 and 16 are divided into compartments by upright partitions 31. These partitions 31 are horizontally spaced to provide a plurality of compartments 33 which may either be all of the same size or of different sizes, as desired. FIG. 3 illustrates suitable structural support members 32 to establish and maintain plates 14 and 16 in place. Support members 32 are, obviously, secured to the walls of tower 10 with plates 14 and 16 extending transversely across tower 10 as either small or large elements forming a perforated barrier to upward gas flow and downward liquid flow through tower 10.

In the specific example of a limestone scrubber so far described, tower 10 is utilized for the removal of gaseous sulphur dioxide from flue gases produced from the combustion of sulphur containing fossil fuel. The flue gases entering tower 10 through inlet duct 11 are generally at a temperature of about 200 degrees Fahrenheit or higher. After passing nozzles 13, however, the flue gases are substantially at a saturation temperature of approximately 110 to 140 degrees Fahrenheit. The liquid or reactive absorbent utilized within tower 10 is preferably a slurry containing reactive calcium carbonate or calcium hydroxide combined with generally non-reactive calcium sulfite and/or calcium sulfate. In this embodiment, the absorbent slurry is introduced through manifold 20. The non-reactive solids of the slurry is present due to recirculation of at least some of the slurry discharged from the bottom 18 of tower 10 to manifold 20. Optional sparge system 17 is used to introduce air into bottom 18 in order to produce calcium sulfate.

The mixture of slurry and gas in contact within compartments 33 will form a fluidized mass of liquid and gas which will have an apparent upper surface of perhaps double or triple the expected active surface of the slurry alone. The apparent upper level of the froth or bubbling mass will generally be ½ to 10 inches, more or less, above the upper surface of plates 14 or 16.

What is claimed is:

1. A gas-liquid contact device for $SO_2$ absorption from flue gas comprising:
   (a) a tower having a gas inlet, a gas outlet, and means for passing gas upwardly therethrough;
   (b) at least one tray positioned within said tower and extending across the flow path of said gas, said tray being perforated with a first region of said tray having a first open area value and with a second region of said tray having a second open area value, the total open area of said tray being between approximately 5% and 60% of the total area of said tray;
   (c) an unbaffled flow path within the tower both above and below said tray;
   (d) oxidation air means for injecting oxidation air into the tower, said oxidation air forcing the in-situ oxidation of the sulfur compounds contained in the flue gas, said oxidation air means comprising mechanical agitation;
   (e) supply means for injecting organic acid additives onto the flue gas;
   (f) nozzle means within said tower above said tray and arranged so as to spray a promoted liquid slurry containing a buffering agent onto said tray, said promoted liquid slurry maintaining a pH on said tray typically below a value of 5 and being supplied at a stoichiometry of from 1.02 to 1.10, said promoted liquid slurry also contributing to the $SO_2$ absorption rate of said tower; and,
   (g) an integral reaction tank located adjacent the flue gas inlet, said tank collecting spent scrubber solution or slurry therein and having a side outlet.

2. The apparatus of claim 1 wherein said tray is perforated with a plurality of holes, said holes having an open area ranging from about 0.25 square inches to about 3.14 square inches.

3. The apparatus of claim 2 wherein said promoted liquid slurry is sodium based and wherein the liquid flux rate of said promoted liquid slurry is greater than 5 gallons per minute per square feet (GPM/$FT^2$).

4. The apparatus of claim 3 wherein said promoted liquid slurry is limestone based and wherein the liquid flux rate of said promoted liquid slurry is approximately 100 gallons per minute per square foot (GPM/$FT^2$), more or less.

5. The apparatus of claim 4 wherein the pH of the promoted liquid slurry on said tray is less than the pH of said promoted liquid slurry being recirculated within said tower.

6. The apparatus of claim 5 wherein said promoted liquid slurry has a total solids concentration ranging from about 0% to 40%.

7. The apparatus as set forth in claim 6 wherein said buffering agent includes alkali magnesium, ammonium, sodium salts, and/or buffering organic acids, said buffering organic acids optionally comprising dibasic acid, formic acid, and/or adipic acid.

8. The apparatus as set forth in claim 7 wherein said promoted liquid slurry deposited upon said tray has a concentration of said buffering agent of 500 ppm or less.

9. A method of flue gas desulfurization which includes the steps of introducing flue gas into a lower region of a spray tower; causing the flue gas to flow upward therein through at least one perforated tray whose openings vary; and spraying the flue gas after passing through this tray with a promoted scrubber solution to react with the sulfur compounds in the flue gas, wherein the improvement comprises the steps of:

(a) combining additives with the flue gas for absorption of the sulfur compounds in the flue gas and for subsequent removal of these sulfur compounds from the flue gas, said additives comprising alkali magnesium, ammonium, sodium salts, and/or organic acids, said organic acids optionally comprising dibasic acid, formic acid, and/or adipic acid;

(b) maintaining a pH upon the tray at a value typically of 5 or less with a reagent utilization range within the tower of from 90% to 100%;

(c) providing an unbaffled gas flow path vertically within the tower both above and below this tray;

(d) injecting oxidation air into the tower to force the in-situ oxidation of the sulfur compounds contained in the flue gas, said step of injecting oxidation air comprising the step of mechanically agitating said promoted scrubber solution; and, (e) collecting spent scrubber solution in an integral reaction tank having a side outlet.

10. The method as set forth in claim 9 further comprising the step of providing a tray whose total open area varies from 5–60%.

11. The method as set forth in claim 10 further comprising the step of perforating the tray with openings having an open area ranging from about 0.25 square inches to about 3.14 square inches.

12. The method as set forth in claim 11 further comprising the step of spraying the promoted scrubber solution on the flue gas at a rate between 5–100 gpm/ft$^2$ of tray area.

13. The method as set forth in claim 11 further comprising the step of concentrating the promoted scrubber solution into a slurry having a range of from 0–40% solids.

14. The method as set forth in claim 13 further comprising the step of basing the promoted scrubber solution upon one or more of the following: sodium, ammonium, lime, limestone, or magnesium promoted lime.

15. The method as set forth in claim 14 further comprising the step of maintaining a pH upon the tray at a value of 5 or less.

* * * * *